Dec. 29, 1959 L. SCHART 2,919,154
AUTOMATIC GROUND LOAD RELEASING DEVICES FOR
LOAD CARRYING PARACHUTES
Filed Jan. 2, 1957 6 Sheets-Sheet 1
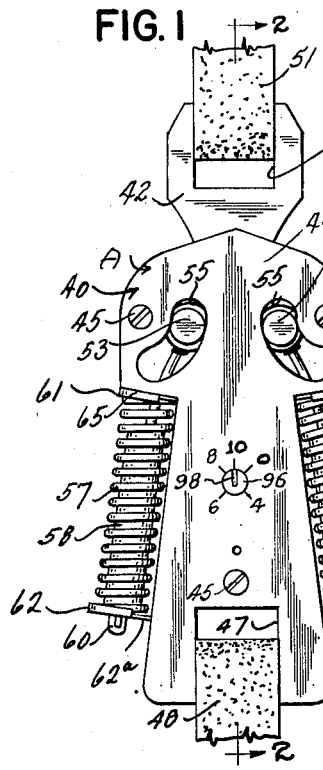
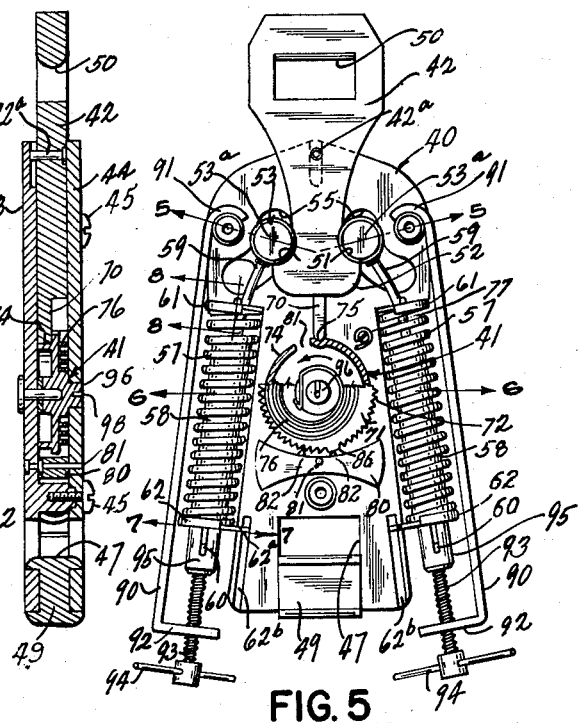
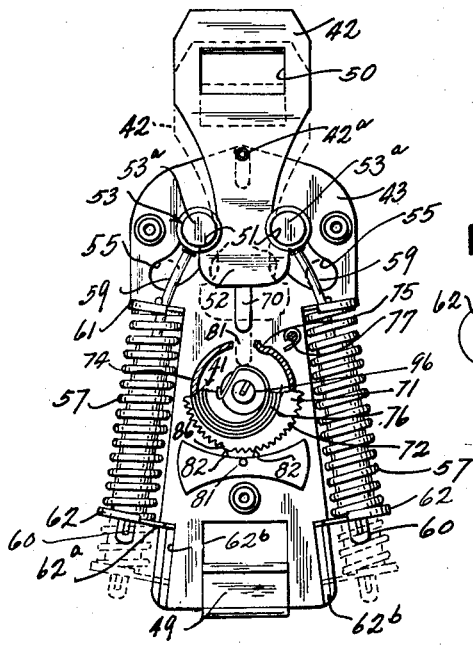
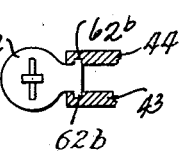
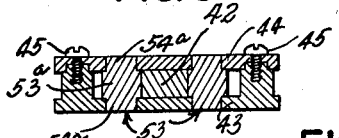
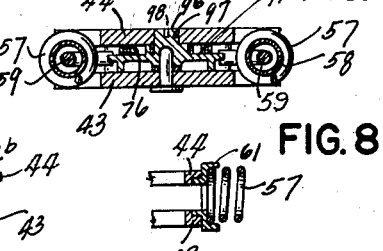
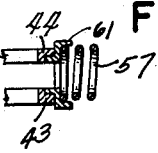
INVENTOR
Ludwig Schart
BY
ATTORNEYS INVENTOR
Ludwig Schart

BY
ATTORNEYS

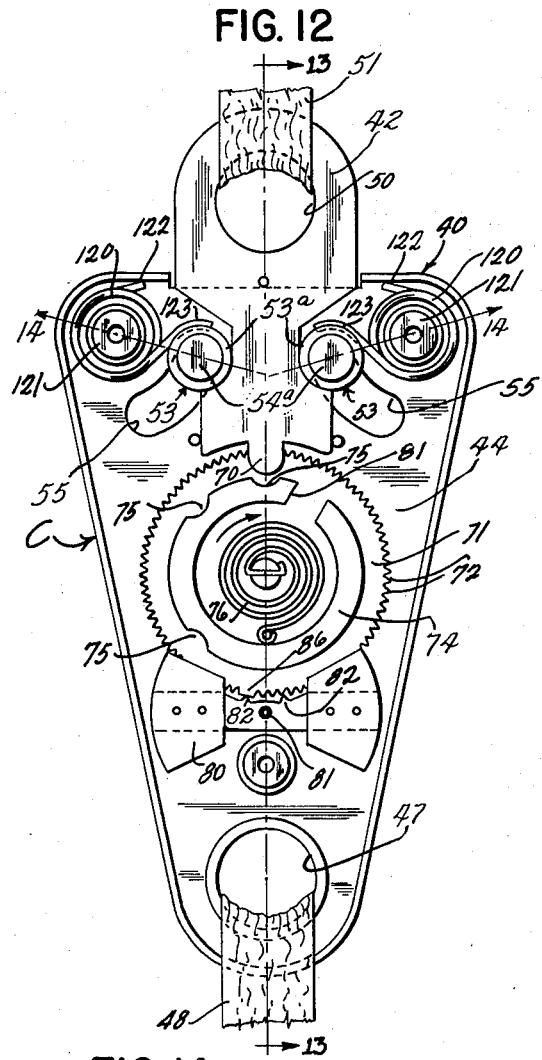
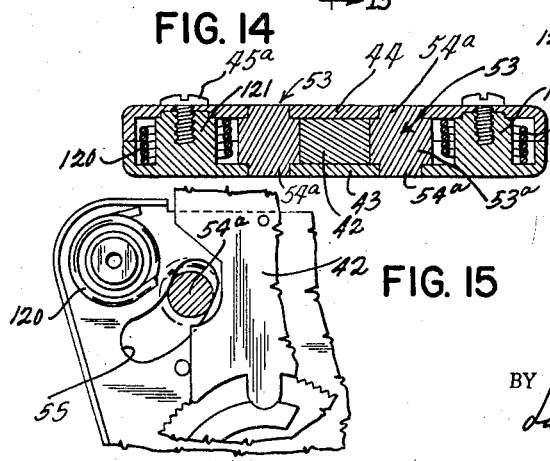
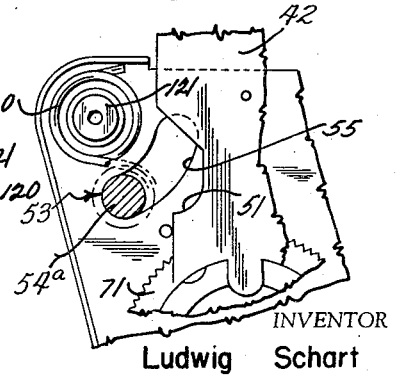

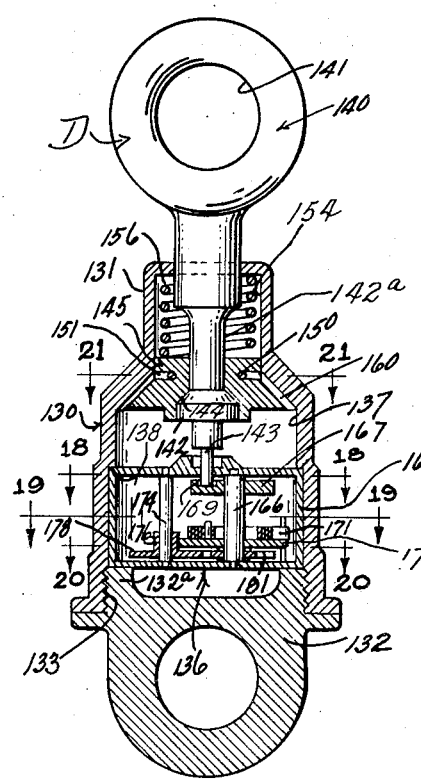

Dec. 29, 1959 L. SCHART 2,919,154
AUTOMATIC GROUND LOAD RELEASING DEVICES FOR
LOAD CARRYING PARACHUTES
Filed Jan. 2, 1957 6 Sheets-Sheet 5

INVENTOR
Ludwig Schart

BY
ATTORNEYS

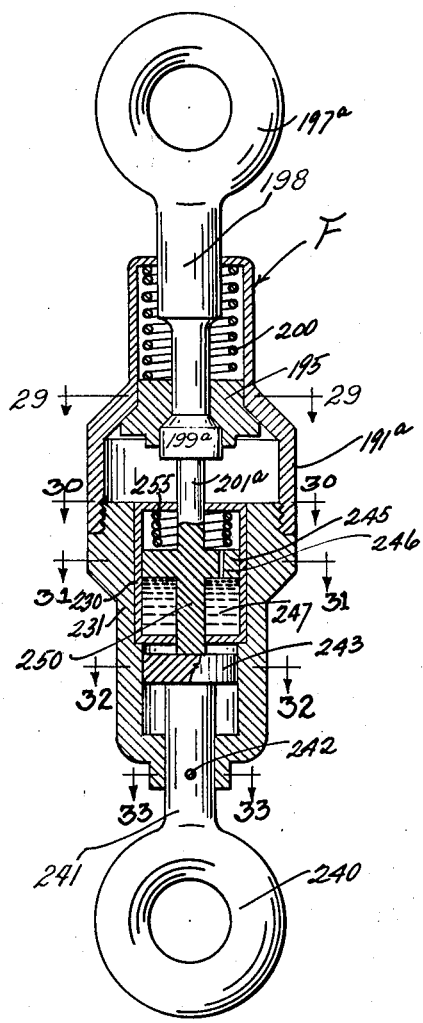
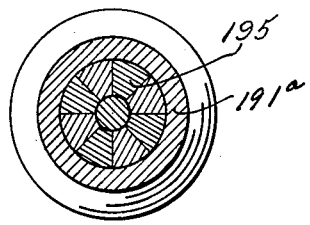
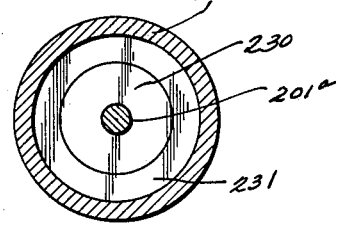
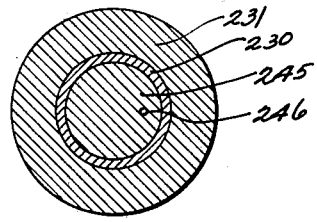
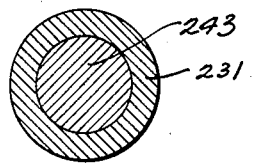
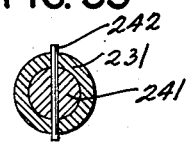

United States Patent Office 2,919,154
Patented Dec. 29, 1959

2,919,154

AUTOMATIC GROUND LOAD RELEASING DEVICES FOR LOAD CARRYING PARACHUTES

Ludwig Schart, Traunreut, Upper Bavaria, Germany

Application January 2, 1957, Serial No. 632,044

9 Claims. (Cl. 294—83)

This invention relates to improvements in automatic ground load releasing devices for load carrying parachutes.

This invention relates to a rugged, compact and efficient operating type of automatic ground load releasing device for parachutes, mainly intended to be used in the dropping of cargoes and having improved means to insure the separation of the parachute canopy from the cargo as soon as the latter makes contact with the ground. The primary purposes served in the use of such a device avoids the dragging of the cargo over the ground should a strong wind keep the parachute canopy inflated; the separation of a stabilized mine immediately upon contact with the earth to prevent detection due to inflation of the parachute canopy, and for use in the deceleration of aircraft during landing.

The primary object of this invention is the provision of an automatic ground load release device for parachute canopies having improved means to delay the arming of the device after dropping until inflation of the parachute canopy has been stabilized beyond the period of quick change of initial loads.

With conventional cargo hooks and other devices to serve the purpose of lowering cargoes from aircraft by means of parachute canopies the separable parts of such devices become armed at the initial inflation of the parachute canopy. Thus, it has happened that if a reduction of load on the coupling occurs to a value which is determined by the spring or other force embodied in the coupling, the part connected to the load separates from the parachute canopy attached portion of the device. Known devices cannot compensate for load reductions immediately following the maximum load shock. To avoid premature separation the improved automatic ground releasing device of the present invention delays actual arming until dangerous reductions of force have been exhausted. Therefore the release of the load from the parachute canopy cannot occur until impact of the load with the ground.

Other objects and advantages of this invention will be apparent during the course of the following detailed description.

In the ccompanying drawings, forming a part of this specification, and wherein similar reference characters designate corresponding parts throughout the several views:

Figure 1 is a front elevation of one form of improved release device or mechanism embodying mechanical means to releasably connect the load and canopy portion including a mechanical escapement mechanism to delay arming of the device for a predetermined period of time after initial inflation of the parachute canopy during a load dropping operation.

Figure 2 is a vertical cross sectional view taken through the device of Figure 1 substantially on the line 2—2 of Figure 1 but without the connecting webs.

Figure 3 is an inside view of the device of Figure 1 with a cover plate removed to expose certain internal operating details of the escapement and other parts; portions of which are in cross section.

Figure 4 is a view of the details of Figure 3 with the device in armed position ready to release the load from the parachute canopy when the former contacts the earth to reduce load pull.

Figures 5, 6, 7 and 8 are transverse cross sectional views taken through portions of the release device substantially on their respective lines 5—5; 6—6; 7—7; and 8—8 of Figure 3.

Figure 9:
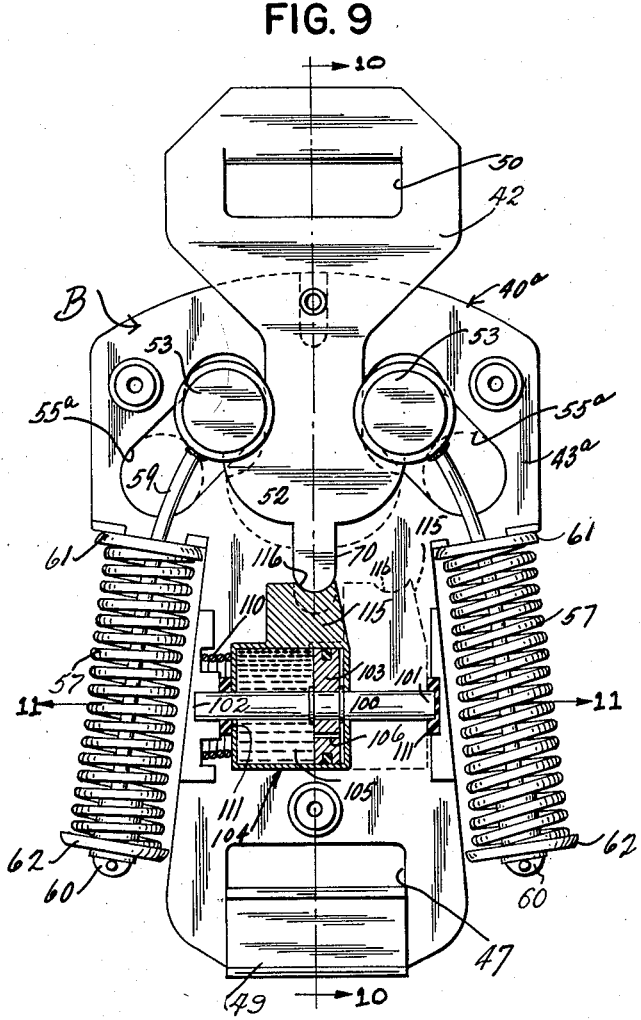

Figure 9 is a front elevational view of another form of invention, with a cover plate thereof removed; this form of invention embodying parachute canopy and load attaching portions which substantially resemble those of the form shown in Figure 1 but which embodies a spring actuated hydraulic type of delaying mechanism.

Figure 10:
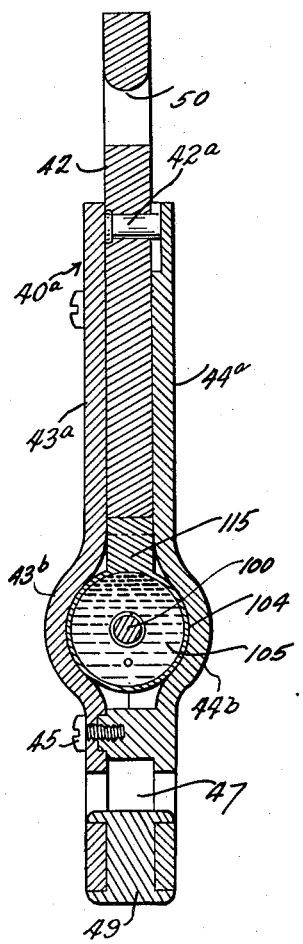

Figure 10 is a vertical cross sectional view taken through the entire device of Figure 9, substantially on the line 10—10 of Figure 9, but also showing the side plate which is removed as shown in Figure 9.

Figure 11:
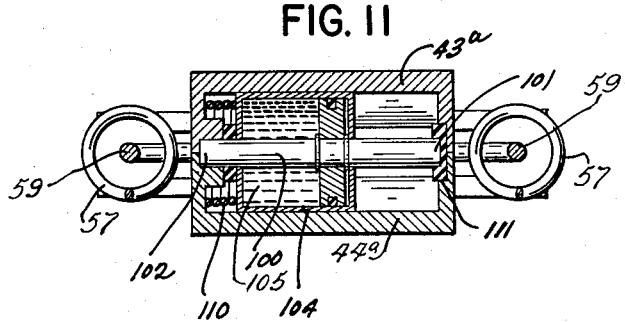

Figure 11 is a transverse cross sectional view taken through the device of Figure 9, taken substantially on the line 11—11 of Figure 9, but showing both plates of the casing structure in assembled relation.

Figure 12 is a front elevation of another form of release device which is quite similar to that of the form of invention shown in Figure 1; embodying substantially the same type of arming delay mechanism, but which embodies another form of spring means for insuring separation of the parachute canopy and load attaching portions at the time of impact of the load with the earth.

Figure 13 is a vertical cross sectional view taken substantially on the line 13—13 of Figure 12; showing both casing plates.

Figure 14 is a transverse cross sectional view taken substantially on the line 14—14 of Figure 12; showing both casing plates bolted in position.

Figure 15 is a fragmentary view, partially in cross section, showing the relation of certain detent means with other portions of the release device.

Figure 16 is a view of the portions illustrated in Figure 15, but showing the relation of parts after the release device has become armed.

Figure 17 is a vertical cross sectional view taken through another form of load releasing device capable of longer time delays in order to effect arming.

Figures 18, 19, 20 and 21 are transverse cross sectional views taken substantially on their respective lines 18—18; 19—19; 20—20; and 21—21 in Figure 17 of the drawings.

Figure 22:
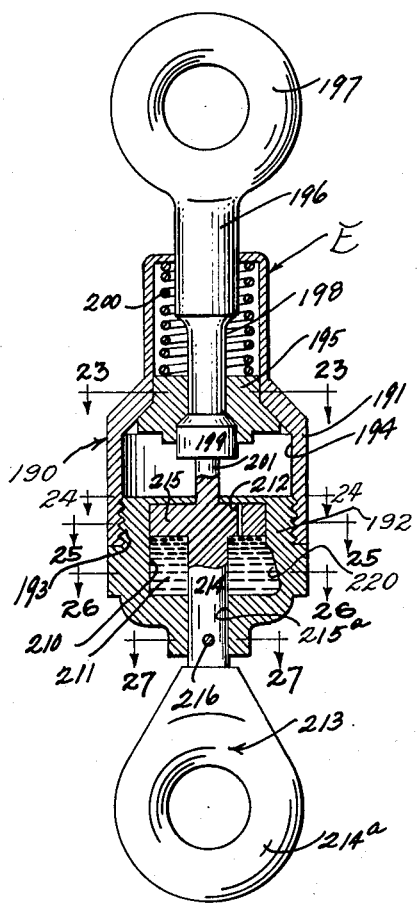
Figure 23:
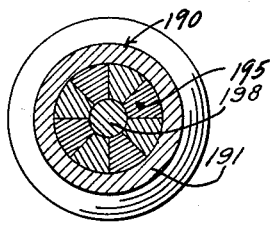
Figure 24:
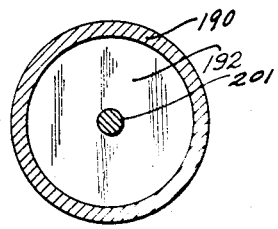
Figure 25:
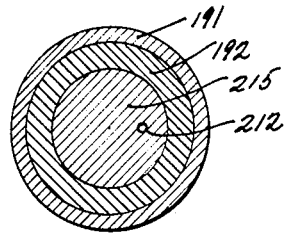
Figure 27:
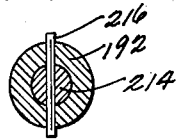
Figure 26:
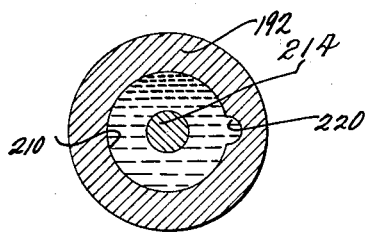

Figure 22 is a vertical cross sectional view taken through still another form of invention having an improved hydraulic escapement means.

Figures 23, 24, 25, 26 and 27 are cross sectional views taken substantially on their respective lines 23—23; 24—24; 25—25; 26—26; and 27—27, shown in Figure 22 of the drawings.

Figure 28 is a vertical cross sectional view taken through another form of release device embodying a spring actuated hydraulic escapement means.

Figures 29, 30, 31, 32 and 33 are cross sectional views taken substantially on the respective lines 29—29; 30—30; 31—31; 32—32 and 33—33 shown in Figure 28 of the drawings.

In the drawings, wherein are shown a number of forms of the invention, the letter A designates one form of the invention, shown in Figures 1 to 8 inclusive, B another form shown in Figures 9 to 11 inclusive; C another form shown in Figures 12 to 16 inclusive; D another form shown in Figures 17 to 21 inclusive; E another form shown in Figures 22 to 27 inclusive; and F another form shown in Figures 28 to 33 inclusive.

Referring to the form of invention A, as shown in Figures 1 to 8 inclusive, the same includes a casing structure 40 housing an escapement mechanism 41 which functions to arm a member 42 which may be referred to as the bolt or link. The frame or casing structure 40 comprises flat plate-like sections 43 and 44 which may be bolted or secured together as by machine screws 45, at a plurality of locations, in order to define a compartment therebetween for the scapement mechanism 41. These plate portions 43 and 44 at their lower ends have aligning openings 47 adapted to receive webbing or strap means 48 to which the load is secured. A filler block 49 provides a stirrup to receive the attaching loop of the strap 48. The member or link 42 is located at the end of the casing 40 opposite the strap or web 48. It has an opening 50 therethrough to receive a strap or webbing 51 to which the rings of the shroud lines of a parachute canopy are connected (not shown). It will be noted that the casing structure 40 is thin and flat and very compact in arrangement. The link 42 is flat and at opposite sides thereof has lateral sockets 51 provided by reducing the width of the plate 42 above a lower head 52 and in which sockets are adapted to rest detents 53 in order to secure the member or link 42 upon the casing 40 in the position shown in Figure 3.

The detents 53 each comprise a roller-like central body portion 53a and end cylindrical reduced portions 54a (see Figure 5). These detents 53 are guided along paths determined by arcuate slots 55, a pair of which are formed in each of the plates 43 and 44 comprising the frame 40 and which are located at each side of the locus of the bolt or link 42. The reduced ends 54a of the detents 53 are snugly seated for sliding in the slots 55. The slots 55 at their proximate upper ends are spaced so that when the detents 53 are located at said proximate ends, the detents will then rest in the sockets 51 of the parachute canopy attached link or member 42. From their upper ends, the slots 55 slope divergently downward and away from each other in order that their lower ends will be spaced a sufficient distance that when the detents 53 are located in said lower ends the bolt or member 42 will be able to leave the chamber of the frame 40 between the plates 43 and 44.

The detents 53 are normally spring urged to seat in the lowermost distantly related ends of the slots 55. This is accomplished by providing spiral compression springs 57 for each of the detents 53, having form retaining sleeves 58 slidably located axially therein. Rods 59 are connected at their upper ends to each of the detents 53, at the central enlarged portions 53a thereof, in the position shown in the drawings, and said rods extend longitudinally through the sleeves 58 and at their lower ends are provided with enlarged key-heads 60. Upper and lower caps 61 and 62 are provided for the seating of the upper and lower ends of the springs 57 therein. Caps 61 seat against edge surfaces 65 provided upon the plates 43 and 44, as indicated in Figure 1 when the springs are under compression. The lower caps 62 are provided with lateral extensions 62a which normally slide in grooves 62b on the inner surfaces of the plates 43 and 44, as indicated in Figures 3, 4 and 7 of the drawings. With the caps 61 seating against the edges 65 of the frame 40 the springs 57 may expand to their full lengths, as determined by engagement of the caps 62 against the key-heads 60, as shown in Figure 4 of the drawings in dotted lines, and in which position it will be noted that the detents will be located at the extreme lower ends of the slots 55. The springs 57 will be compressed to their fullest extent after discharge of the load or cargo when a sufficient load or force is applied to the device for overcoming the power of springs 57, and at which time the link or bolt 42 will be pulled upwardly to move the detents 53 to the tops of the slots 55, in the position shown in full lines in Figure 4.

The escapement mechanism 41 is held against movement by an extension 70 upon the connector member 42 until the weight of the load is suspended from the inflated parachute canopy so as to move the member 42 from the position shown in Figure 3, to the position shown in Figure 4. At that time the escapement mechanism commences operation for the purpose of arming the device.

The escapement mechanism 41 comprises a timer gear 71 having peripheral teeth 72 thereon throughout its circumference. It includes a segmental shaped flange 74 at one side thereof provided with one or more radial indentations 75. The extension 70 rides upon the outer circumference of segment 74 and normally it seats in a depression 75, so that because of force of the springs 57 rotation of the timer gear 71 will be prevented. A spiral leaf spring 76 is provided for the timer gear, having one end thereof secured to the timing gear and the other end secured to a post 77 on the frame 40, the force of which normally rotates the timer gear in the direction indicated by the arrow in Figure 3 of the drawings. An oscillator or escapement member 80 is pivoted at 81 upon the frame 40 between the plates 43 and 44. Its ends are weighted so as to permit the same to function as an escapement control. Member 80 is provided with two teeth 82 in spaced relation in engagement with the teeth 72 in order to permit regulated escapement movement in accordance with well-known principles. The escapement gear rotates slowly as the escapement movement takes place and only after the device has suspended the load under the inflated parachute. It is only when the escapement segment 74 has moved into the position shown in Figure 4 of the drawings that the link protrusion 70 will lie in alignment with an opening 81 in the segment 74. The device is then armed and in position to permit release of the load when the latter contacts ground.

If during a run of the timing mechanism, a force reduction on the release device occurs, sufficient that the springs 57 acting upon restraining members or detents 53 will again depress the removable link or bolt 42, disengagement of the device is not yet possible because the protrusion 70 exerts pressure against the segment 74. This in turn will block the timer for the duration of the force reduction.

The timer gear 71 may be reset in the ready position by several means, such as by the omission at 86 of a tooth or teeth in the gear. To simplify rewinding, the gear teeth have symmetrical flanks in order that the gear may be turned backwards slowly for resetting purposes.

Suitable tooling means must be provided for resetting the parts after use. Such means may consist of brackets 90 having arched flanged ends 91 which may engage over the bolt studs between the plates 43 and 44, in the position shown in Figure 3. These brackets at their lower ends are right angled at 92 and provided with screw threaded openings for receiving setting bolts 93 having handles 94 at their lower ends. At their inner ends bolts 93 are provided with sockets 95 for receiving the key-heads 60.

After use of the device the coupling parts will be in the position shown by the dotted lines in Figure 4 of the drawings, so far as expansion of the springs 57 is concerned. The resetting tools are then applied and turning the screw threaded shanks 93 will compress springs 57. While this is being done, the member 42 will lie in the dotted position shown in Figure 4 and when the springs have been compressed to the full line position shown in Figure 4, the member 42 may then be pulled out and the escapement backed sufficient to enable seating of the extension 70 in a segment recess 75. The spring resetting tools then may be removed, because the detents 53 will be held in the sockets 51, of the link or member 42 for holding the springs 57 in the compressed positions shown in Figures 1 and 3. It is to be noted that a hub portion 96 of the escapement gear 71 rests within an opening 97 in a frame plate 44. This portion 96 is slotted at 98 for insertion of a screw driver or like winding key for resetting the escapement wheel. If time delays are desired at shorter than the maximum delay, a plurality (not shown) of the sockets 75 may be provided along the segment 74. To indicate the delay for which the device may be reset, a dial is provided, using numerals in terms of seconds. They are indicated as at "0," "4," "6," and "10" on the outer surface of the cover 44 in Figure 1. It is here shown that the slot 98, which serves as an indicator, is lined up with the numeral "10." This indicates that the device is set for a ten second delay interval before it can be armed.

In order to stabilize the position of the supporting link 42, the same is provided with an extension or pin 42a, rigid therewith, which rides in a slot at the inner surface of the plate 43 (see Figure 2).

So far as applicable the same numerals and reference parts will be given to the forms of inventions shown at B—Figures 9 to 11 inclusive, and C—Figures 12 to 16 inclusive, as have been applied to the form A above described, except as hereinafter noted.

Referring to the form of invention B, shown in Figures 9, 10 and 11, the same illustrates a spring actuated hydraulic escapement mechanism for effecting a predetermined delay prior to arming. Its casing structure 40a includes plates 43a and 44a which have associated therewith substantially the same type of link 42 as shown in the form of invention A. These plates 43a and 44a are formed slightly different than the plates 43 and 44 of the form of invention A, including bulging portions 43b and 44b respectively, as shown in Figure 10, to accommodate a hydraulic cylinder to be subsequently described. The plates 43a and 44a are provided with slots 55a which to all intents and purposes are the same as the slots 55 of the form of invention A. The detents and springs are also substantially identical to those shown in form A.

The escapement mechanism for form B is mainly hydraulic and includes a fixed shaft 100 secured and mounted at one end 101 between the plates 43a and 44a and at its opposite end secured in a socket 102 of said plates. The rod 100 is in horizontal position, that is, at right angles to the longitudinal axis of the coupling device. Thereupon is disposed a fixed piston 103 which is placed within a movable cylinder 104. The cylinder is arranged on a horizontal axis and is normally filled with oil or some other fluid 105. An escapement duct or port 106 extends through the piston 103 to permit the liquid to pass between opposite sides of the piston as the cylinder 105 is moved. A spiral compression spring 110 is seated between the plates at one end and at its opposite end engages against an end wall of the cylinder 104, as shown in Figure 9. The spring 110 effects movement of the cylinder 105. Any approved seals (not shown) may be placed at the ends of the cylinder and upon the piston rod 100, and other seals 111 may be provided upon the rod 100 at ends of travel of movement of the cylinder to prevent loss of the hydraulic fluid. The cylinder 104 is shown of one-piece construction, but it may be made of several pieces to enable dis-assemblage. The cylinder 104 is provided with a lug or protrusion 115 which functions similar to segment 74 of the form of invention A. It has one or more sockets 116 therein for receiving the extension 70 of connector part 42.

Figure 9 shows the parts when the device is ready for use. The extension 70 rests in a socket 116 and prevents displacement of the cylinder. At the time of discharge of the load from the aircraft and when the release device is brought under tension, the springs 57 will be further compressed to enable movement of the detents 53 to the tops of the slots 55a, as above described for the form of invention A. At this time the spring 110 will urge the cylinder 104 along the piston 103 and its rod 100. If load reduction should occur before the device is armed, the extension 70 will again press upon the protrusion 115 and prevent momentarily further cylinder displacement. The time delay will therefore be lengthened and not shortened. The action of the spring 110 will cause fluid to flow through the port 106 to the opposite side of the fixed piston in the cylinder. The protrusion 115 will move along with its cylinder to the final position shown in dotted lines in Figure 9, and at which time the release device is armed. Air may be used in the cylinder just as effectively as oil or other liquid, but apparently will not work entirely satisfactory because compressibility of air must be considered as well as the lower density of air at higher altitudes. The force of the springs must have such characteristics that they will permit operation of the timing mechanism at a predetermined load force, so the device will become armed only through application of that load force which reaches a predetermined magnitude.

Referring to the form of invention C shown in Figures 12 to 16 inclusive, the same to all intents and purposes is identical with the form of invention A, and similar reference numerals have been applied thereto. The main difference consists in the fact that spiral type coil springs 120 are employed for detents 53, the same being received upon studs 121, which receive the plate connecting screws 45a; an end of each of the coils engaging the inner framework of the plate, as indicated as 122 in Figure 12, and the opposite end 123 of each spring 120 engaging the detent 53 for normally forcing it downwardly along the respective slot 55. The action of the escapement in this form C is the same as that for the form A, and the operation of the device generally is identical. The springs 120 possibly cannot be made as strong as the springs 57 in the form of invention A, but they may be adequate to serve the purpose of providing a load releasing mechanism satisfactory for receiving only predetermined low loads.

In the form of invention D shown in Figures 17 to 21 inclusive longer periods of arming delay are possible. This sort of load releasing mechanism is also more compact. This is important where space limitations are factors.

The form D is substantially different than the flat casing types of forms A, B and C. It comprises a casing structure 130 including an upper cylindrical section 131 and a lower load connecting portion 132. The latter has an externally screw threaded portion 132a which is threaded into the internal screw threads 133 provided in the lower end of the casing portion 131. A timer mechanism 136 is located in the chamber or compartment 137 of the casing structure 130, preferably resting upon the upper extension 132a of the lower section 132; a shoulder 138 being provided in a downwardly facing relation for receiving a top of the timer 136 in order that the same may be anchored securely against longitudinal movement within chamber 137. The release device D also includes a parachute canopy connecting bolt, link or member 140 having an upper portion provided with a transverse opening 141 for receiving the canopy connecting webbing. A stem or shank 142a of the member 140 is provided with a pin extension 143, on the lower end thereof, adapted to cooperate with the timer mechanism 136 in a manner to be subsequently described. A head 142 is provided upon the bolt shank 142a, above the pin extension 143, adapted to be socketed within a recess 144 formed in a split retaining ring 145 constructed of a plurality of segments 148, which are radially divided, and normally maintained in assembled relation by means of a split spring 150. The latter releasably seats within an annular groove 151 provided by recessing the segments 148. The upper ends of the segments are seated within the reduced upper end of chamber 154 of the casing portion 131. When in this position the segments 148 will receive the head 142 of the bolt or member 140 therein. When the device D is at rest and not in use, the escapement mechanism 136, in a manner to be subsequently described, will hold the bolt mechanism 140 in the position shown in Figure 17. A spiral compression spring 156 is socketed in the upper chamber of portion 154 of the casing structure 130, compressed therein and normally urging the segmental shaped retaining assemblage 145 to such position that the segments 148 thereof cannot become laterally displaced, due to close seating in the chamber 154.

When the parachute canopy is deployed for supporting a load or cargo, the member 140 will be lifted upwardly slightly, due to the normal clearance 160 between the sloping outer surfacing of the segments 148 and the sloping top surfacing of the recess 137. Under weight of the load the lower pin end 143 of the link 140 will be lifted to permit starting operation of the timer 136.

The timer 136 preferably comprises a casing structure 165 which may be of a plurality of pieces. In the drawing it is shown as a single piece, but access to the gearing therein may be provided by separating it to include a cover plate as part of the casing structure. An eccentrically disposed shaft 166 is rotatably supported upon the top and bottom walls of the casing 165, having a brake drum disc 167 keyed thereto. The disc 167 is provided with an upwardly facing recess 169 adapted to receive the lower end of pin 143 in order to arrest rotation of the escapement mechanism when the device is not in use nor supporting a load. The escapement mechanism may further include a gear 170 keyed upon the shaft 166 normally urged to rotate by a spiral spring 171 which is keyed at one end to the gear 170 and at its other end being connected at 172 to the casing 165. A second shaft 174 is vertically positioned upon the casing 165. It supports a pinion gear 176 with which the teeth of the larger gear 170 engage. Integral with the pinion 176 is an escapement gear 178 having teeth thereon normally engageable with spaced escapement teeth 180 provided upon an oscillating escapement member 181. The latter is pivoted upon the shaft 166.

If desired, I may fill the compartment of the casing 136 with a damping liquid, such as oil, in order to prevent too fast oscillation of the escapement member 181. The latter may be provided with wings or other means to retard the rate of oscillation in such bath.

In operation, the parts are assembled for support of the load by an inflated parachute canopy, in the relation shown in Figure 17. As soon as the cargo or load has been dropped and the sustaining parachute canopy deployed the link or bolt 140 will move upwardly, to release braking action upon the wheel 167. The spring 171 will then start action of the escapement mechanism and the wheel 167 will be slowly rotated until an opening 180a therein moves into position below the pin 143. The device is then armed. When the load hits the ground, the spring 156 will force the segmental shaped ring 145 downwardly. The force of the spring 156 is greater than the assembly holding force of spring 150, thus the segments 148 will be expanded into the larger portion of the chamber 137 and slip over the head 142. The bolt 140 will be separated from the assemblage under anchoring influence of the parachute canopy. Thus, the load is freed from connection with the canopy.

In the forms of invention E and F, hydraulic means is provided in order to delay arming. The form E includes a cylindrical shaped casing structure 190 having upper and lower portions 191 and 192 respectively screw threaded connected at 193 and defining a compartment 194 which is shaped to receive a collapsible segmental retaining disc structure 195 possessing the same characteristics as the segmental disc structure for the form of invention D. The bolt or canopy connecting link 196 includes an apertured head 197 to receive webbing attached to the canopy shroud lines and it includes a shank 198 provided with an enlarged lower head 199 normally retained in position by the collapsible segmental structure 195. This may be retained in position by a split ring, as for form D, although not shown in the drawings. A compression spiral spring 200 is located in the upper end of the casing portion 191, normally urging the segmental structure 195 downwardly so that when the load is released after a parachute descent of the cargo it may discharge the segments 195 over the head 199 and permit the bolt 196 to release the device.

The lower casing section 192 is provided with a chamber 210 adapted to receive oil or some hydraulic liquid 211 which may be sealed therein. The cargo connecting member 213 at its lower end is provided with an apertured head 214a for connection to the cargo webbing. This member 213 is provided with a shank 214 extending slidably in sealed relation through a passageway 215a in the lower end of the casing portion 192. Shank 214 is provided with a movable piston 215, rigid therewith, and operating within the cylinder 210. The piston 215 is provided with an escape duct or port 212 therethrough, for passage of the oil or liquid 211 from one side of the piston to the other. Above the piston 215 is a pin extension which slidably extends in sealed relation through the top wall of casing portion 192 and at its top engages with the end 199 of bolt 197. A shear pin 216 connects the shaft 214 to the cargo connecting member 213 and the casing portion 192. Thereby the piston 215 cannot move along the cylinder chamber 210 until pin 216 is sheared.

In use during a cargo drop the segmental retaining ring 195 contacts the cone shaped surfacing of the chamber 194, in the position shown in Figure 22, with the bolt head 199 engaging in the sockets provided in the segmental retaining ring 195. The link or bolt 196 will be connected to the casing structure 190. When sufficient load pull is applied exceeding the shear strength of the pin 216, it will be severed and thus enable the weight of the load (the parachute canopy having been inflated) to pull the piston 215 downwardly along the chamber 210; the hydraulic liquid bleeding through the duct 212 to the upper side of the chamber. The orifice or duct 212 is quite minute and therefore a considerable period of time will pass before actual arming takes place. If a load reduction occurs before the piston 215 reaches its extreme lower position, the bolt 196 will not be able to travel since the pin end 201 contacts the head 199 of the link 196 prevents it from moving a distance such as will enable the spring 200 to urge the segments of the rings 195 over the head end 199 of the link. When the piston 215 has reached the lower end of the chamber 210 the upper portions of the segments of the split ring 195 will have passed out of the upper chamber of the casing part 191 and the bolt 196 will release as soon as the load hits the ground and takes its pull off of the inflated canopy.

If desired, the cylinder chamber 210 does not need to be entirely filled with liquid. Thus a short movement of the piston necessary to shear the pin 216 will take place prior to the time that any liquid is forced through the orifice 212.

It may be advantageous to have the piston 215 move very slow at the start and later on faster. This is taken care of by increasing the size of the orifice or by additionally providing a cut-out 220 at the lower portion of the chamber 210, so that prior to the time the piston 215 descends to its lowest position in the chamber 210 the liquid will also by-pass through cut-out 220 to the top side of the piston.

Referring to the form of invention F it may be more favorable to move the piston by spring pressure. To that end I may provide a liquid filled cylinder 230 mounted in the lower casing portion 231 of the assemblage. The upper part 191a of the casing structure of this form F is the same as the casing portion 191 of the form of invention E, and it houses therein a bolt 197a almost identical with the bolt 197 of the form of invention E and retained in position by a split segmental shaped ring assemblage 195 and spring 200 operating thereon the same as for the parts bearing similar reference numerals shown in the form E of Figure 22. The load connecting member 240 is provided with a webbing connected end for attachment of a load. It has a shank 241 reciprocable in the lower end wall of the casing portion 231 and likewise it has a shear pin 242 which functions precisely as the shear pin 216 of the form of invention E. The load connecting member 240 is provided with a guide head 243 sliding in the chamber of the lower portion 231 of the casing structure so that the member 240 will not tilt laterally. A piston 245 is slidably disposed in the cylinder 230 having a port 246 therein. The cylinder 230 receives oil or a liquid 247 which bleeds from one side of the piston to the other through duct 246. The piston 245 may include a stabilizing rod 250 which slidably extends in sealed relation through the lower end of the cylinder 230 and engages the head end 243 of the load attaching portion 240. A spring 255 lies in the cylinder 230 under compression between the top of the piston 245 and the top end of the cylinder 230, normally urging the piston downwardly against the fluid or liquid therein. The piston 245 has a top pin extension 201a which slidably extends in sealed relation through casing 230 and engages the head 199a of link 197a.

When tension on the device F during a load dropping exceeds a certain magnitude, the pin 242 will be sheared. The link or portion 240 will then move immediately to its lowermost position as determined by the head 243 engaging the bottom wall of the casing portion 231.

The device F cannot become armed until the spring 255 has forced the piston 245 downwardly to the bottom of the cylinder 230. Fluctuations in time delay may result with this device, such as when load reductions take place, the bolt 198 applies a pressure upon the shank 201 which in turn will accelerate the movement of the piston to the bottom of the cylinder. Such inaccuracies are avoided in some of the forms of invention above described.

The improved releasing device of this invention may be used in connection with deceleration of fast flying airplanes during approach or landing procedure. The efficiency of a brake parachute decreases considerably as airplane speed decreases. Therefore the parachute canopy can be readily jettisoned with the use of the releases above described when the aircraft has been decelerated to a certain velocity so as to produce only slight drag force.

It will be readily apparent from the foregoing that an automatic disconnecting device has been provided for supporting cargoes descending by means of parachute canopies. The device is so controlled that the ability of the load to separate from the canopy is delayed for such a length of time as is required to reach a steady force and steady descent, including equilibrium of the forces with equilibrium velocity. Thus, the device remains locked until rapid changes of forces during opening procedure has passed. The releasing device of this invention consists of very few components which can readily be handled and will not suffer deformation nor require any considerable maintenance.

Various changes in the size, shape and arrangement of parts may be made to the forms of invention herein shown and described, without departing from the spirit of the invention or scope of the claims.

I claim:

1. In a load releasing device for releasing loads from parachute canopies incident to ground contact the combination of a load supporting frame, a parachute canopy attaching member, detent means on the frame, movable upon the frame to a position for connecting the member to the frame, spring means on the frame normally moving the detent means to a position where it will permit release of the said member from the frame, delay timing means carried by the frame having blocking means thereon to block movement of said member to a releasing position upon the frame, the detent normally holding the said member upon said frame against release after the load is airborne and armed until the load makes ground contact.

2. In a coupling device for supporting a load from a parachute canopy the combination of a load attaching frame, a link attachable to a parachute canopy and releasable from said frame, said link having a socket thereon, detent means upon the frame engageable in said socket to releasably hold the frame attached to said link upon airborne support of a load by a parachute canopy, spring means normally acting to move the detent means upon the frame to an inoperative position with respect to the socket of said link, and time delay mechanism mounted upon the frame normally holding the link against movement upon the frame to a releasing position, said delay means including means to arm the link a predetermined interval after a load is airborne for release from said frame thereafter when the load makes ground contact.

3. A release device as described in claim 2 in which the time delay mechanism includes a fixed piston upon said frame, a movable cylinder upon the frame having a hydraulic fluid therein, the piston having an escapement therethrough for passage of the fluid from one side of the piston to the other as the cylinder moves, spring means normally urging the cylinder to an arming position of the same with respect to the link, and means on the cylinder and link to block the link against release from the frame until the cylinder has been moved by said spring means to an armed position of said link with respect thereto.

4. An automatic ground releasing device for cargo parachutes comprising a coupling frame, a parachute canopy connector member, a movable detent carried by the frame in position to hold said connector member from release upon the frame so long as the load is airborne by the parachute canopy, spring means normally acting upon the detent to move said detent to a position permitting release of the connector member from the frame, a time delay mechanism carried by the frame normally held inoperative by the connector member until the load is airborne by a parachute canopy for blocking release positioning of the connector member from the frame until the passing of a predetermined interval, said connector member being provided with a shoulder, detent means comprising a collapsible segmental split ring the segments of which normally seat against said shoulder to hold the connector member upon the frame so long as the load is airborne by a parachute canopy, and spring means normally urging said segments to a releasing position with respect to said shoulder to enable detachment of the connector member from the frame when the parachute supported load lands.

5. In an automatic ground load releasing device for cargo parachutes, the combination of a load attaching frame, a parachute canopy atthing connector member hving shoulders thereon, movable detents carried by the frame for movement into and out of engagement with the shoulders, springs for the detents normally urging the detents out of engagement with the shoulders to permit detachment of the parachute canopy connector member from the frame, time controlling means mounted upon the frame for blocking movement of the connector member upon the frame to a releasing position, and means connected to the frame acting under the influence of a load imposed upon the frame for enabling movement of the parachute canopy connector member to set the time controlling means in operation.

6. In an automatic ground load releasing device for cargo parachutes the combination of a load attaching frame, a parachute canopy attaching connector member having shoulder means thereon, detents having movable connection with the frame and movable thereon in an upward direction to engage the shoulder means of the connector member for holding the latter connected to the frame, said detents being movable downwardly upon the frame for release from said shoulder means, springs normally acting on the detents for moving them to a connector member releasable position, a time delay mechanism positioned upon the frame normally engaging the connector member to be held inoperative thereby, said frame having means associated therewith for disengaging the normal contact of said connector member with the frame to enable the delay mechanism to be set in operation to enable release of the connector member when the load release device contacts the ground.

7. A releasing device as described in claim 6, in which the frame is provided with means to permit a slight upward movement of the detents and connector member when the load shock initially comes upon the inflated parachute canopy whereby to release the time delay mechanism and permit start operation of the latter.

8. An automatic ground releasing device as described in claim 6, in which means is mounted upon the frame for releasing the force action of the springs in order to control movements of the connector member and detents to permit resetting connection of the connector member with respect to the detents and said frame.

9. In an automatic ground load releasing device for cargo parachutes, the combination of a load attaching frame having downwardly divergent slots, a parachute canopy attaching connecting member movably carried by the frame having opposed upwardly facing shoulders, movable detents mounted upon the frame for movement along said slots to engage said shoulders for holding the member connected to the frame, springs connected to the detents for normally moving them to a downward position along said slots to an inoperative position with respect to said shoulders, time delay means normally held inoperative by the connecting member when the connecting member and frame are not in load supporting position, said connecting member at the time of load shock moving upwardly in the frame to release the time delay mechanism for actuation, said time delay mechanism having means thereon associated with said connecting member to enable the latter to collapse when ground contact of the load is made in order to enable said springs to disconnect the detents from said shoulders.

References Cited in the file of this patent
UNITED STATES PATENTS

| | | |
|---|---|---|
| 2,057,699 | Williams | Oct. 20, 1936 |
| 2,413,450 | Johnsen | Dec. 31, 1946 |
| 2,414,023 | Cooper | Jan. 7, 1947 |
| 2,424,215 | Anderson | July 22, 1947 |
| 2,534,704 | Frieder et al. | Dec. 19, 1950 |
| 2,667,376 | Schlachter | Jan. 26, 1954 |
| 2,685,924 | Van Haaften | Aug. 10, 1954 |
| 2,693,980 | Heidman | Nov. 9, 1954 |
| 2,732,245 | Lamoigne | Jan. 24, 1956 |